(12) United States Patent
Yan et al.

(10) Patent No.: US 11,632,041 B2
(45) Date of Patent: Apr. 18, 2023

(54) POWER SEMICONDUCTOR MODULE

(71) Applicant: Delta Electronics, Inc., Taoyuan (TW)

(72) Inventors: Chao Yan, Taoyuan (TW); Liping Sun, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/444,386

(22) Filed: Aug. 4, 2021

(65) Prior Publication Data

US 2021/0367509 A1 Nov. 25, 2021

Related U.S. Application Data

(63) Continuation-in-part of application No. 16/558,162, filed on Sep. 2, 2019, now abandoned.

(30) Foreign Application Priority Data

Sep. 25, 2018 (CN) .......................... 201811113723.7

(51) Int. Cl.
  *H02M 1/44* (2007.01)
  *H02M 1/12* (2006.01)
  *H02M 7/5387* (2007.01)
  *H02M 3/158* (2006.01)

(52) U.S. Cl.
  CPC ............. *H02M 1/44* (2013.01); *H02M 1/126* (2013.01); *H02M 3/158* (2013.01); *H02M 7/5387* (2013.01)

(58) Field of Classification Search
  CPC ........ H02M 1/44; H02M 1/126; H02M 3/158; H02M 7/5387
  See application file for complete search history.

(56) References Cited

U.S. PATENT DOCUMENTS

| | | | |
|---|---|---|---|
| 2013/0001746 A1* | 1/2013 | Edwards | H01L 28/91 257/E29.342 |
| 2014/0140114 A1* | 5/2014 | Shoji | H02M 7/53871 363/89 |
| 2016/0261178 A1* | 9/2016 | Sato | H02M 1/12 |
| 2020/0091058 A1* | 3/2020 | Riegler | H01L 23/15 |

* cited by examiner

*Primary Examiner* — Metasebia T Retebo
(74) *Attorney, Agent, or Firm* — CKC & Partners Co., LLC

(57) ABSTRACT

The present disclosure provides power semiconductor module, comprising at least three non-jumping power terminals at a non-jumping potential, wherein multiple power semiconductors and at least one first capacitor are integrated within a package and electrically connected between a first non-jumping power terminal and a second non-jumping power terminal of the at least three non-jumping power terminals; and at least one jumping power terminal at a jumping potential. A first jumping power terminal of the at least one jumping power terminal is electrically connected to one terminal of a power inductor and a third non-jumping power terminal of the at least three non-jumping power terminals is electrically connected to the other terminal of the power inductor; wherein at least one second capacitor is electrically connected between the third non-jumping power terminal and at least one of other non-jumping power terminals.

12 Claims, 5 Drawing Sheets

Fig. 8
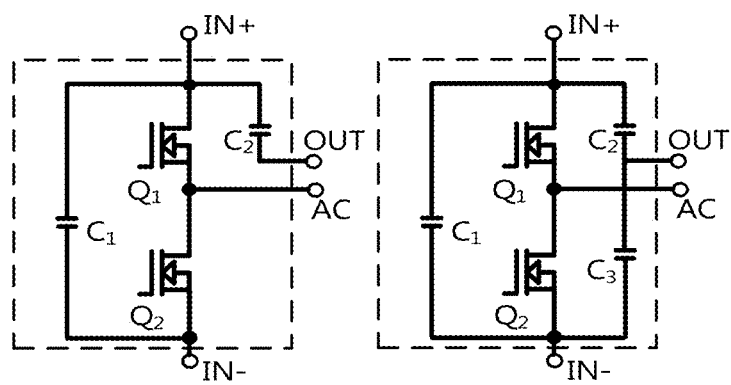
Fig. 9a    Fig. 9b
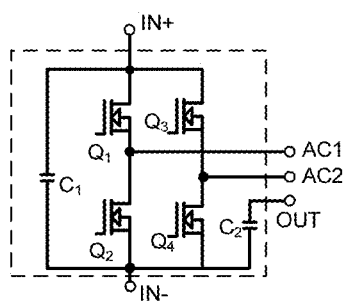    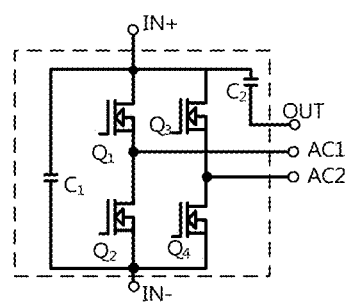    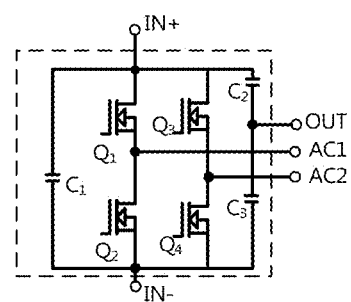
Fig. 9c          Fig. 9d          Fig. 9e

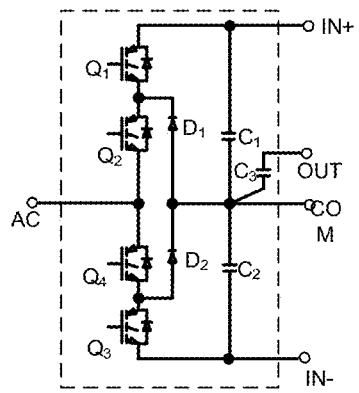 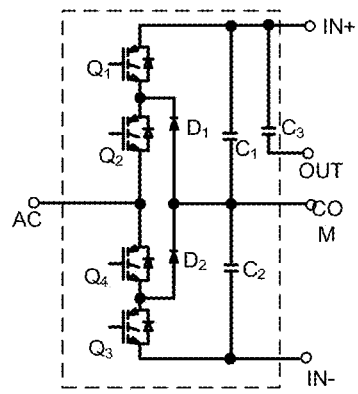 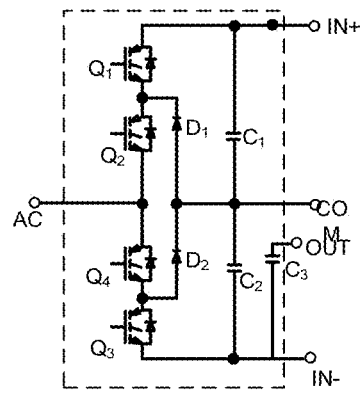
Fig. 9f　　　　　　　Fig. 9g　　　　　　　Fig. 9h
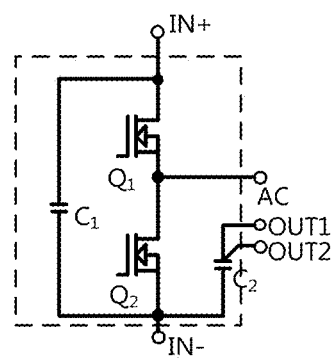
Fig. 10

POWER SEMICONDUCTOR MODULE

CROSS-REFERENCE TO RELATED APPLICATIONS

This non-provisional application is a Continuation-In-Part application of patent application Ser. No. 16/558,162 filed in the U.S. on Sep. 2, 2019 which claims priority to Patent Application No. 201811113723.7 filed in P.R. China on Sep. 25, 2018, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The present invention relates to power semiconductor modules, and particularly to a power semiconductor module with low EMI (Electro-Magnetic Interference) noise.

2. Related Art

In recent years, SIC power semiconductor devices have been increasingly used in high-power power electronic converters due to their excellent switching characteristics. At present, the SIC power semiconductor devices can be a discrete component packaging, such as TO220, TO247, etc, and thereby the package is standardized, the cost is relatively low, and the reliability is relatively high. However, it also brings some problems, such as parasitic parameters (such as stray inductance) are relatively high and large EMI problems can exist in the case of large parasitic parameters application. Therefore, in some high power application, such as power of above 10 KW, SIC power semiconductor modules can be applied. A power semiconductor module provides physical containment for several power semiconductors. These power semiconductors (so-called dies) are typically soldered or sintered on a substrate that carries the power semiconductors, provides electrical and thermal contact and electrical insulation where needed. The power semiconductors are integrated within a package. The power semiconductor module can significantly reduce internal parasitic parameters, and it is more suitable for usage of SIC die connected in parallel. Meanwhile, the driver of the power semiconductor module utilizes the Kevin connection, and the power source and the driver source are completely isolated, thus the problem of common source does not exist and the switching loss can be reduced a lot. However, since the SIC device is a high-speed wide band-gap switch device, the voltage rise rate dv/dt and the current rise rate di/dt of the switching transistor are relatively high, thus the EMI noise is relatively large. There is the same problem as in all high-speed switching devices such as GaN.

As shown FIG. 1, in which a typical half-bridge power semiconductor module is shown. The half-bridge power semiconductor module have three power terminals, IN+, IN−, and AC, where the AC terminal is an EMI noise source. Moreover, the half-bridge power semiconductor module includes a bridge arm having two semiconductors, by integrating the two semiconductors together, the length of the wires between the two semiconductors can be reduced, and the heat dissipation problem of the switches can be solved. Meanwhile, placing a high frequency capacitor outside and connected with the power terminals can reduce the switching peak and EMI noise.

As shown FIG. 2, in which shows a conventional buck circuit including a half-bridge power semiconductor module. The power semiconductor module M' includes a bridge arm having two power semiconductors $Q_1$ and $Q_2$ connected in series, and has three power terminals of IN+, IN− and AC. The IN− and AC terminal are electrically connected to an inductor L and an output capacitor $C_2$, and the IN+ and IN− terminal are electrically connected to an input source Vin and an input capacitor $C_1$. However, due to the physical size of the power semiconductor module M' itself, the stray inductance of the first loop $C_{L1}$, which includes power semiconductors $Q_1$ and $Q_2$, and capacitor $C_1$, will be relatively large and thus affect EMC (Electro-Magnetic Compatibility) characteristics. In prior art, the high-frequency ceramic capacitor $C_1$ can be integrated inside the half-bridge power semiconductor module and disposed at the position closest to the power terminals IN+ and IN− of the power semiconductors $Q_1$ and $Q_2$, as shown in FIG. 3, which can greatly absorb excessive high voltage overshooting and therefore improves system reliability. However, the second loop $C_{L2}$ indicated in FIG. 2 has a parasitic parallel capacitance $C_L$ of the output inductor L and a loop parasitic inductance (not shown), therefore the noise of high frequency on the AC terminal passes from the parasitic $C_L$ to the IN− terminal, which also causes high frequency EMC problems.

Specifically, as shown FIG. 4, in which shows an EMI analysis circuit of a half-bridge power semiconductor module M' applied in a typical buck circuit application, which includes a buck circuit, a primary EMI filter, an EMI LSIN, and an output impedance. Wherein $C_{para1}$ is the parasitic capacitor of the power inductor L. $L_{para1}$ is the parasitic inductance between a terminal A2 of capacitor $C_{x1}$ and the fixed point A3 of power semiconductor module M', and $L_{para2}$ is the parasitic inductance between the point A1 and the capacitor $C_{x1}$.

Moreover, at high frequency, the impedance of the power inductor L is very large, while the impedance of the capacitor $C_{x1}$ is very small. The voltage across A1A2 and the voltage across A2A3 are approximately calculated as below:

$$V_{A1A2} = V_{noise} * ZL_{para2} / (ZL_{para1} + ZC_{para1} + ZL_{para2})$$

$$V_{A2A3} = V_{noise} * ZL_{para1} / (ZL_{para1} + ZC_{para1} + ZL_{para2})$$

Wherein, $V_{noise}$ is the noise voltage between the AC terminal and the IN−terminal. $ZL_{para1}$, $ZL_{para2}$, and $ZC_{para1}$ are the impedances of parasitic inductance $L_{para1}$, parasitic inductance $L_{para2}$, and parasitic capacitance $C_{para1}$, respectively. The voltage $V_{A1A2}$ of A1A2 is converted into differential mode noise, and the voltage $V_{A2A3}$ of A2A3 is converted into common mode noise. Given above, the higher the frequency is, the greater the impedance of the inductance (for example, the parasitic inductance $L_{para1}$ and the parasitic inductance $L_{para2}$) 1 and the greater the noise are.

Therefore, there is an urgent need for a power semiconductor module with low EMI noise.

SUMMARY OF THE INVENTION

In view of this, the present invention intends to provide a power semiconductor module, which has low EMI noise and can greatly reduce engineers' time for solving EMI.

In order to realize the above purpose, the present invention provides a power semiconductor module, wherein the power semiconductor module comprising:

at least three non-jumping power terminals at a non-jumping potential, wherein multiple power semiconductors and at least one first capacitor are integrated within a package and electrically connected between a first non-jumping power terminal and a second non-jumping power terminal of the at least three non-jumping power terminals; and at least one jumping power terminal at a jumping potential, wherein a first jumping power terminal of the at least one jumping power terminal is electrically connected to one terminal of a power inductor and a third non-jumping power terminal of the at least three non-jumping power terminals is electrically connected to the other terminal of the power inductor;

wherein at least one second capacitor is electrically connected between the third non-jumping power terminal and at least one of other non-jumping power terminals of the at least three non-jumping power terminals.

The present invention adds at least one non-jumping power terminal based on the existing power semiconductor module technology, and the non-jumping power terminal and a jumping power terminal are respectively electrically connected to two terminals of a power inductor; and the present invention also adds a high frequency capacitor between the non-jumping power terminal and at least one of other non-jumping power terminals, therefore further reduces EMI noise and significantly saves engineers time for solving EMI.

The above description will be further described in detail below, as well as the further interpretation of the technical solution of the present invention will be provided.

BRIEF DESCRIPTION OF THE DRAWINGS

To make the above and other objects, features, advantages and examples of the invention more apparent and straightforward, a brief description of the drawings is provided as follows:

FIG. 8 is a waveform schematic diagram obtained by performing RFI testing of the power semiconductor module under a first-stage EMI filter according to the present invention.

FIGS. 9a-9h are schematic diagrams of a topology circuit of a power semiconductor module according to another preferred embodiment of the present invention;

FIG. 10 is a schematic diagram of an optimized circuit of a power semiconductor module according to another preferred embodiment of the present invention.

DETAILED DESCRIPTION OF THE INVENTION

Figure 1:
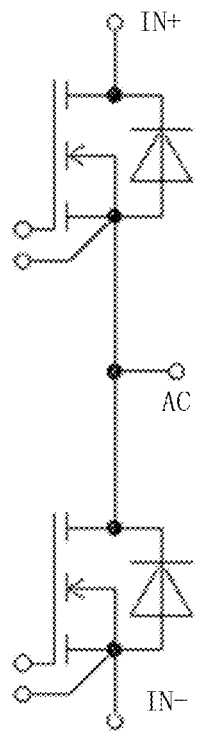
FIG. 1 is a schematic diagram of the structure of a conventional half-bridge power semiconductor module.
Figure 2:
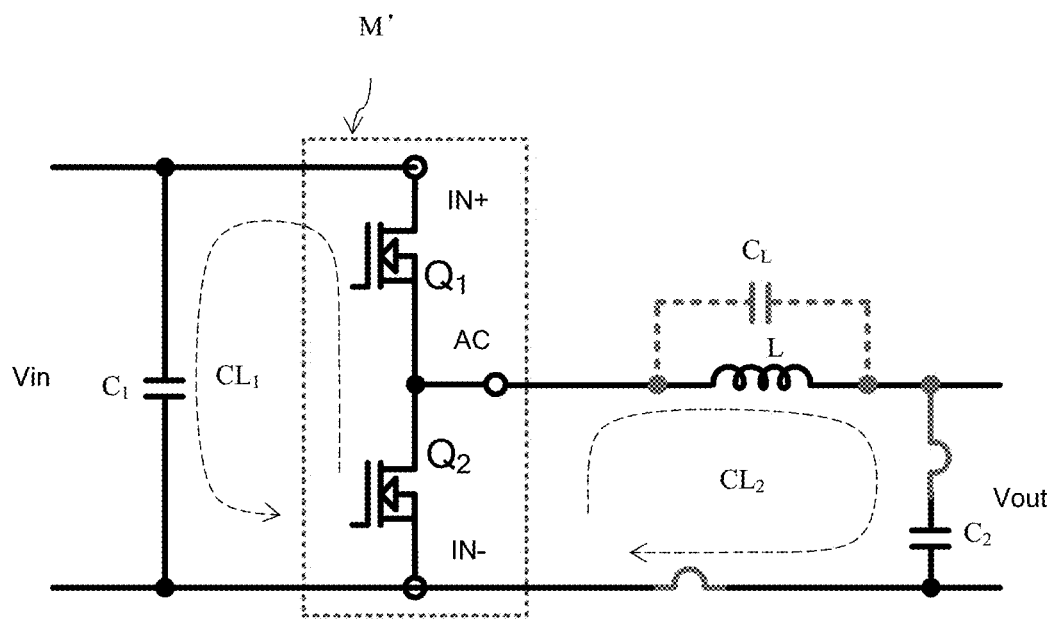
FIG. 2 is a circuit schematic diagram of a conventional power semiconductor module applied in the typical buck circuit.
Figure 3:
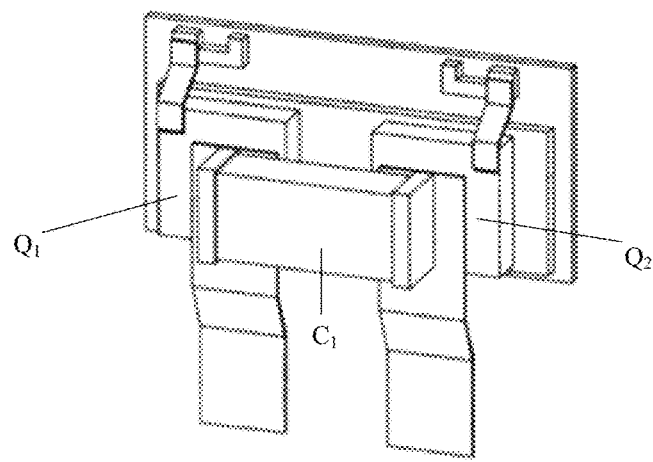
FIG. 3 is a schematic diagram of the structure of a power semiconductor module of the existing integrated high frequency capacitors.

In order to make the description of the invention more elaborate and complete, reference may be made to the accompanying drawings and the various examples described below, and the same numbers in the drawings represent the same or similar components. On the other hand, well-known components and steps are not described in the examples to avoid unnecessarily limiting the invention. In addition, some of the conventional structures and elements already known are shown in the drawings in a simplified schematic manner to simplify the drawings.

The power semiconductor module of the present invention has at least three non-jumping power terminals and at least one jumping power terminal. Wherein, the at least three non-jumping power terminals are at non-jumping potentials, and multiple power semiconductors and at least one first capacitor are electrically connected between a first non-jumping power terminal and a second non-jumping power terminal. At least one jumping power terminal is at a jumping potential. A first jumping power terminal is electrically connected to one terminal of a power inductor and a third non-jumping power terminal is electrically connected to the other terminal of the power inductor. And at least one second capacitor are electrically connected between the third non-jumping power terminal and at least one of other non-jumping power terminals.

In the present invention, the "non-jumping potential" generally refers to a potential, which is at fixed potential or has tiny high-low level jumping with respect to a reference potential point. The tiny high-low level jumping can be, for example, a voltage rising rate dv/dt less than 2V/us. The "jumping potential" generally refers to having a large high-low level jumping with respect to the reference potential point. The large high-low level jumping can be, for example, the voltage rising rate dv/dt greater than 10 V/us. In one embodiment, the threshold values of the above voltage rising rate dv/dt, such as 2V/us or 10V/us, may also be variable fluctuate within a certain range, such as, but not limited to, ten percent, or five percent of 2V/us or 10V/us etc.

Figure 5:
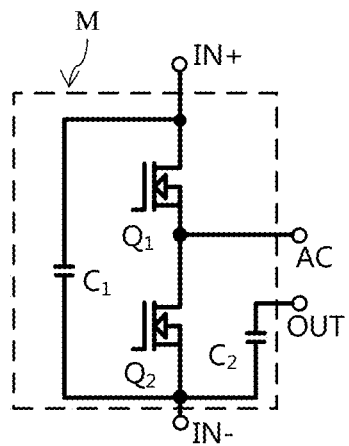
FIG. 5 is a schematic diagram of the structure of a power semiconductor module according to a preferred embodiment of the present invention.

As shown FIG. 5, in which shows a structure of a power semiconductor module according to a preferred embodiment of the present invention. The power semiconductor module M includes four power terminals, that is, terminals IN+, IN−, AC and OUT. Wherein terminals IN+, IN− and OUT are non-jumping power terminals at a non-jumping potential, and the terminal AC is jumping terminal at a jumping potential. In this embodiment, two power semiconductors $Q_1$ and $Q_2$ and a capacitor $C_1$ are electrically connected between terminals IN+ and IN−. The above two power semiconductors $Q_1$ and $Q_2$ are dies connected in series and configured as a bridge arm. The capacitor $C_1$ is connected in parallel with this bridge arm, and terminals AC and OUT are used to respectively electrically connect to both two terminals of a power inductor, and a capacitor $C_2$ is also electrically connected between terminals OUT and IN−.

Figures 6A, 6B, 6C:
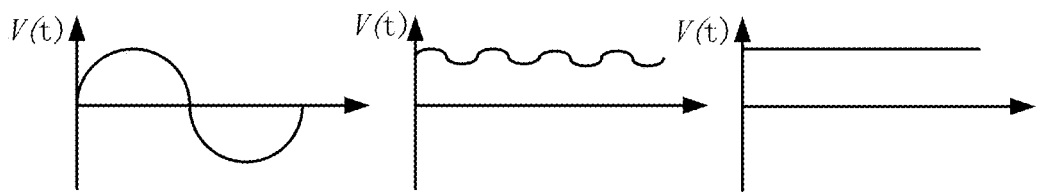
FIGS. 6a-6c are voltage schematic diagrams of the non-jumping pin of FIG. 5 with respect to a reference point.

In this embodiment, terminals IN+, IN−, AC, and OUT are respectively power terminals with current values greater than 1A. Wherein terminals IN+, OUT, and IN− are terminals at a fixed potential, for example, the terminal IN− serves as the reference point at a reference potential (such as a zero potential). Terminals IN+ and OUT are also at fixed potentials with respect to the terminal IN−, which is shown in FIG. 6c. The terminal AC has a relative large high-low level jumping with respect to the terminal IN− (reference point), that is, there is a relative large voltage rising rate dv/dt between AC and IN− (for example, dv/dt>10V/us), which is the noise source of EMI. In other embodiments, terminals IN+, OUT, and IN− may also be sinusoidal ripples superimposed with a frequency <10 kHz, and the voltage rising rate dv/dt is relatively small, such as less than 2V/us, as shown in FIG. 6b. In other embodiments, with respect to the terminal IN−, the terminal OUT also may also be provided with an AC voltage with a frequency <10 kHz, which is also shown in FIG. 6a.

Preferably, in an embodiment of the invention, the capacitors $C_1$, $C_2$ may be high frequency capacitors. More preferably, the capacitor $C_2$ can be a SMC or a capacitor die, and the value of the capacitor can be, for example, greater than 1 nF.

Figure 4:
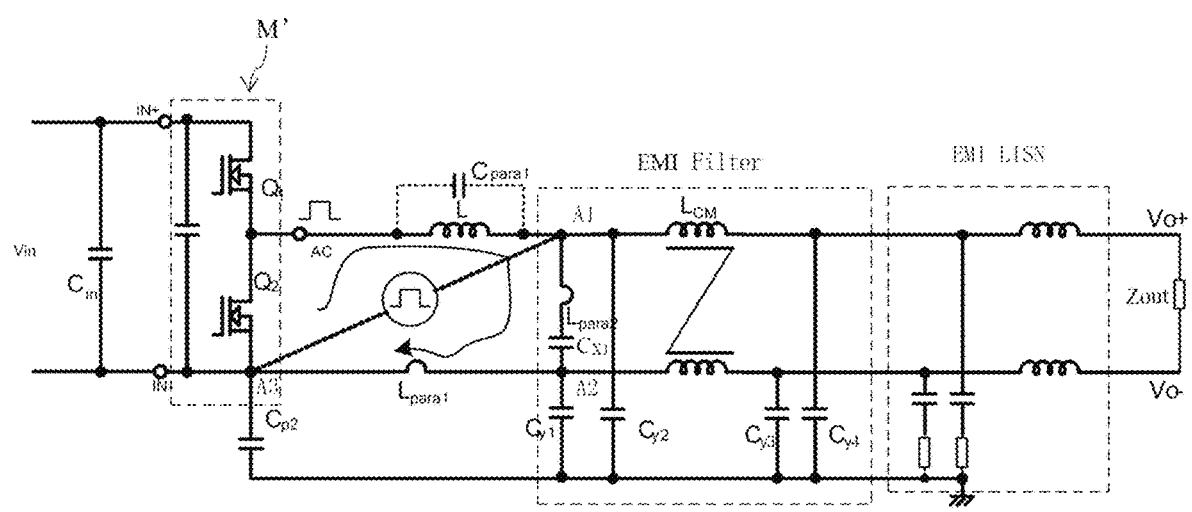
FIG. 4 is a schematic diagram of an EMI analysis circuit of a conventional power semiconductor module applied in a typical buck circuit.
Figure 7:
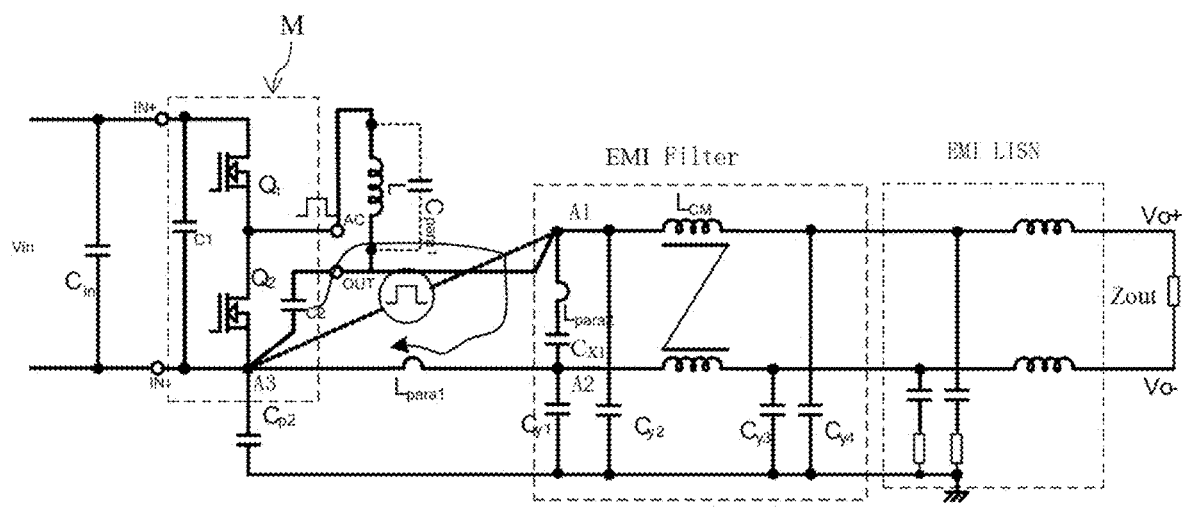
FIG. 7 is a schematic diagram of an EMI analysis circuit of a power semiconductor module applied in a typical buck circuit according to the present invention.

As shown FIG. 7, in which shows an EMI analysis circuit of a power semiconductor module applied in a typical buck circuit according to the present invention. Wherein, with respect to the conventional power semiconductor module M' shown in FIG. 4, a power terminal OUT and a capacitor $C_2$ are added to the power semiconductor module M of the present invention, and the capacitor $C_2$ is a high frequency capacitor with a parasitic inductance <1 nH. The value of the capacitor $C_2$ is much larger than the parasitic capacitance $C_{para1}$ of $L_{para1}$ of the power inductor L. The parasitic inductances and $L_{para2}$ are relatively small, so in high frequency, the impedance at both terminals of A1A2 is approximately equal to the impedance $ZC_2$ of the capacitor $C_2$ and the voltage $V_{A1A3}$ across A1A3 is approximated equals to $V_{noise} \cdot ZC_2/(ZC_2+ZC_{para1})$. Since $ZC_2$ is much smaller than $ZC_{para1}$, the noise amplitude at across A1A3 is significantly reduced.

FIG. 8 is a waveform schematic diagram obtained by performing RFI testing on the power semiconductor module under a first-stage EMI filter according to the present invention. Using the connection mode of the power semiconductor module of the present invention, the waveform of the RFI is obtained from the test under the topology of the high-speed switching device GaN, as shown in FIG. 8. Seen from the waveform, the above power supply under first-level EMI filtering could satisfy the Class B standard.

It can be understood that the power semiconductor module of the present invention is not limited to the above topology, and it can be widely applied to topologies such as boost, buck, Herric, and T-type three level, etc. At least one jumping node and at least three non-jumping nodes should be included in each topology. Moreover, the power terminal of the power semiconductor module of the present invention in each topology should include both terminals of the power inductor and a non-jumping power terminal.

As shown FIGS. 9a to 9h, it shows topology circuits of the power semiconductor modules according to other preferred embodiments.

As shown FIGS. 9a to 9b, the difference between the power semiconductor module thereof and that shown in FIG. 5 is that: in the power semiconductor module shown in FIG. 9a, the capacitor $C_2$ is electrically connected between terminals OUT and IN+; In the power semiconductor module shown in FIG. 9b, the capacitor $C_2$ is electrically connected between terminals OUT and IN+, and the capacitor $C_3$ is electrically connected between terminals OUT and IN−.

As shown in FIG. 9c to FIG. 9e, the difference between the power semiconductor module thereof and that shown in FIG. 5 is that: the power semiconductor module shown in FIG. 9c to FIG. 9e includes two half-bridge arms between terminals IN+ and IN−, which respectively includes power semiconductors $Q_1$ and $Q_2$ connected in series, and $Q_3$ and $Q_4$ connected in series, wherein each of the power semiconductors $Q_1$, $Q_2$, $Q_3$, and $Q_4$ is a die, i.e., a bare semiconductor. And terminals AC1 and AC2 terminal at a jumping potential are the center points of the two half-bridge arms respectively. Moreover, in the power semiconductor module shown in FIG. 9c, the capacitor $C_2$ is electrically connected between terminals OUT and IN−; in the power semiconductor module shown in FIG. 9d, the capacitor $C_2$ is electrically connected between terminals OUT and IN+. In the power semiconductor module shown in FIG. 9e, the capacitor $C_2$ is electrically connected between terminals OUT and IN+, and the capacitor $C_3$ is electrically connected between terminals OUT and IN−.

As shown in FIG. 9f to FIG. 9h, the difference between the power semiconductor module thereof and that shown in FIG. 5 is that: the power semiconductor module shown in FIG. 9f to FIG. 9h includes a full-bridge arm between terminals IN+ and IN−, which includes power semiconductors $Q_1$, $Q_2$, $Q_3$ and $Q_4$ connected in series. Each of the power semiconductors $Q_1$, $Q_2$, $Q_3$, and $Q_4$ is a die, i.e., a bare semiconductor. The power semiconductor module further includes a first bridge arm having diodes $D_1$ and $D_2$ connected in series, which is connected in parallel with both terminals of the power semiconductors $Q_2$ and $Q_3$. A second bridge arm having capacitors $C_1$ and $C_2$ connected in series is included between terminals IN+ and IN−, and the terminal COM at a non-jumping potential is a center point of the first bridge arm and the second bridge arm. Also, in the power semiconductor module shown in FIG. 9f, the capacitor $C_3$ is electrically connected between the terminal OUT and the second bridge arm. In the power semiconductor module indicated in FIG. 9g, the capacitor $C_3$ is electrically connected between terminals OUT and IN+ terminals. In the power semiconductor module indicated in FIG. 9h, the capacitor $C_3$ is electrically connected between terminals OUT and IN−.

As shown in FIG. 10, in order to better optimize the effect of EMI, the present invention can also add a power terminal OUT2 as an auxiliary terminal on the terminal of the capacitor $C_2$, and the terminal OUT2 is electrically connected to the OUT1 terminal. The terminals AC and OUT1 are electrically connected at both terminals of the power inductor (such as the power inductor L in FIG. 7), and the terminal OUT2 is a non-jumping power terminal and is connected to one terminal of the external capacitor (such as capacitor $C_{x1}$ in FIG. 7). This minimizes the equivalent inductance of $C_2$, and compared with the power semiconductor module shown in FIG. 5, EMI noise is less.

It can be understood that all the embodiments including the embodiment shown in FIG. 9a to FIG. 9h can change the output power terminal from one to two in the manner of FIG. 10, and those are not considered as the limitation of the present invention. Moreover, when making the layout of the power semiconductor module shown in FIG. 5, in order to optimize EMI, one terminal of the power inductor and one terminal of the external capacitor may be respectively connected to the terminal OUT of the power semiconductor module.

While the invention has been disclosed in the above implementations, it is not intended to limit the invention, and various modifications and retouches may be made by those skilled in the art without departing from the spirit and scope of the invention. The scope of protection of the invention therefore is subject to the scope defined by the appended claims.

What is claimed is:

1. A power semiconductor module, comprising:
    at least three non-jumping power terminals at a non-jumping potential, wherein multiple power semiconductors and at least one first capacitor are electrically connected between a first non-jumping power terminal and a second non-jumping power terminal of the at least three non-jumping power terminals; and
    at least one jumping power terminal at a jumping potential, wherein a first jumping power terminal of the at least one jumping power terminal is electrically connected to one terminal of a power inductor and a third non-jumping power terminal of the at least three non-jumping power terminals is electrically connected to the other terminal of the power inductor;
    wherein at least one second capacitor is electrically connected between the third non-jumping power terminal and at least one of other non-jumping power terminals of the at least three non-jumping power terminals, and wherein the multiple power semiconductors, the at least one first capacitor and the at least one second capacitor are integrated within a package;
    wherein a terminal of the second capacitor that is electrically connected to the third non-jumping power terminal is further provided with an auxiliary terminal, the auxiliary terminal is electrically connected to a terminal of an external capacitor, and the third non-jumping power terminal and the auxiliary terminal are physical pins.

2. The power semiconductor module according to claim 1, wherein the first non-jumping power terminal is used as a reference point at a reference potential; and
    the jumping power terminal has a high-low level jumping with respect to the reference point with a voltage rising rate greater than 10V/us.

3. The power semiconductor module according to claim 2, wherein the non-jumping power terminal is at a fixed potential with respect to the reference point; or has a sinusoidal ripple with a frequency less than 10 kHz with respect to the reference point with the voltage rising rate less than 2V/us; or is provided with an AC voltage with a frequency less than 10 KHz with respect to the reference point.

4. The power semiconductor module according to claim 2, wherein the first capacitor and the second capacitor are high frequency capacitors.

5. The power semiconductor module according to claim 4, wherein the first capacitor and the second capacitor are high frequency filtering capacitors.

6. The power semiconductor module according to claim 1, wherein the value of the second capacitor is greater than 1 nF.

7. The power semiconductor module according to claim 1, wherein the second capacitor is a Surface Mount Capacitor (SMC) or a capacitor die.

8. The power semiconductor module according to claim 1, wherein the multiple power semiconductors include at least one bridge arm, and each bridge arm includes at least two power semiconductors connected in series.

9. The power semiconductor module according to claim 1, wherein the power semiconductor module is a high frequency switching power semiconductor module.

10. The power semiconductor module according to claim 8, wherein the first jumping power terminal of the at least one jumping power terminal is a center point of the bridge arm.

11. The power semiconductor module according to claim 1, wherein the at least three non-jumping power terminals further includes a fourth non-jumping power terminal, wherein at least one third capacitor is electrically connected between the fourth non-jumping power terminal and at least one of other non-jumping power terminals excluding the third non-jumping power terminal among the at least three non-jumping power terminals.

12. The power semiconductor module according to claim 1, wherein the at least three non-jumping power terminals further includes a fifth non-jumping power terminal, the fifth non-jumping power terminal and the third non-jumping power terminal being electrically connected.

* * * * *